(12) United States Patent
Matsuda et al.

(10) Patent No.: US 8,238,969 B2
(45) Date of Patent: *Aug. 7, 2012

(54) MOBILE DEVICE

(75) Inventors: Hiroaki Matsuda, Kawasaki (JP);
Tatsuhito Araki, Kawasaki (JP);
Yoshiya Matsumoto, Kawasaki (JP);
Manabu Sotodate, Kawasaki (JP);
Wataru Murata, Kawasaki (JP); Ken Shoji, Kawasaki (JP); Ryo Hattori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 795 days.

This patent is subject to a terminal disclaimer.

(21) Appl. No.: 12/256,612

(22) Filed: Oct. 23, 2008

(65) Prior Publication Data

US 2009/0111514 A1    Apr. 30, 2009

(30) Foreign Application Priority Data

Oct. 30, 2007  (JP) .................................. 2007-281993

(51) Int. Cl.
*H04M 1/00* (2006.01)
(52) U.S. Cl. ............... 455/556.1; 455/550.1; 455/575.1; 455/575.2; 455/575.3
(58) Field of Classification Search ............... 455/550.1, 455/572, 573, 575.1, 575.3
See application file for complete search history.

(56) References Cited

U.S. PATENT DOCUMENTS

| 8,036,725 B2 * | 10/2011 | Araki et al. ................. 455/575.3 |
| 2009/0111538 A1 * | 4/2009 | Araki et al. ................. 455/575.3 |

FOREIGN PATENT DOCUMENTS

| JP | 8-154117 | 6/1996 |
| JP | 9-270726 | 10/1997 |
| JP | 2007-102006 | 4/2007 |
| JP | 2009-110278 | 5/2009 |
| JP | 2009-111719 | 5/2009 |

OTHER PUBLICATIONS

Japanese Office Action issued Jul. 5, 2011 in related Japanese Patent Application No. 2007-281993 (1 page).
Japanese Office Action issued Jul. 5, 2011 in Japanese Patent Application No. 2007-281992 (1 page).

* cited by examiner

*Primary Examiner* — Temesgh Ghebretinsae
*Assistant Examiner* — M D Talukder
(74) *Attorney, Agent, or Firm* — Staas & Halsey LLP (57) ABSTRACT

A mobile device includes a trigger having a rod-like body fixed at one end. A housing has a first hole into which the body is inserted. A sensor detects that the trigger has been operated in the direction in which the body is pulled from the hole. A buzzer is activated in response to the sensor's having detected the operation of the trigger. A second hole is formed in a firmly fitted member. The body is inserted in the second hole so as to be freely slid forward or backward against the hole. The fitted member is fitted firmly in the entrance portion of the first hole; and a sealing member contacts the internal wall of the first hole and the body.

6 Claims, 13 Drawing Sheets

MOBILE DEVICE

CROSS-REFERENCE TO RELATED APPLICATIONS

This application is based upon and claims the benefit of priority of the prior Japanese Patent Application No. 2007-281993, filed on Oct. 30, 2007, the entire contents of which are incorporated by reference herein.

BACKGROUND

1. Field

An aspect of the invention relates to a mobile device that has, for example, a housing and a trigger serving to activate an alarm device which is a buzzer and forming the outer shape of the device together with the housing.

2. Description of the Related Art

The use of mobile devices such as mobile phones and handheld video game machines has increased greatly recently. While these mobile devices incorporate more sophisticated functions, the device size and weight are further reduced. Mobile devices incorporating a security buzzer, especially for children and women, are also in demand.

For example, Japanese Laid-open Patent Publication No. 2007-102006 discloses a configuration in which a security buzzer is integrated with a mobile phone. Although not a security buzzer, Japanese Laid-open Patent Publication No. 9-270726 discloses a structure for covering the sound emitting hole of a ringer with a waterproof seal. Japanese Laid-open Patent Publication No. 8-154117 discloses the structure for rendering the loudspeaker of a telephone impervious to water by means of a water-repellent sheet.

Where a waterproof function is incorporated in a mobile device such as a mobile phone in addition to a buzzer such as a security buzzer, how to mount the buzzer in a small space and enable it to function while satisfying the waterproof function become problems.

SUMMARY OF THE INVENTION

It is an object of the embodiment to provide a mobile device that has a water-proof function as well as incorporating the function of a buzzer in a small space.

According to an aspect of the embodiment, a mobile device includes a trigger having a rod-like body fixed at one end, a housing having a first hole into which the rod-like body is inserted, the first hole being taperingly formed such that an entrance portion of the hole is larger in diameter than the rod-like body and a step is formed in a predetermined place between both ends of the hole, a sensor for detecting that the trigger has been operated in the direction in which the rod-like body is pulled from the hole, a buzzer activated in response to the sensor's having detected the operation of the trigger, a firmly fitted member in which a second hole is formed so that the rod-like body is inserted in the second hole so as to be freely slid forward or backward against the hole, the firmly fitted member being firmly fitted in the entrance portion of the first hole, a sealing member disposed between the step and the firmly fitted member in the first hole so as to be in contact with the internal wall of the first hole and the rod-like body.

Additional objects and advantages of the embodiment will be set forth in part in the description which follows, and in part will be obvious from the description, or may be learned by practice of the embodiment. The object and advantages of the embodiment will be realized and attained by means of the elements and combinations particularly pointed out in the appended claims.

It is to be understood that both the foregoing general description and the following detailed description are exemplary and explanatory only and are not restrictive of the embodiment, as claimed.

The above-described embodiments of the present invention are intended as examples, and all embodiments of the present invention are not limited to including the features described above.

DETAILED DESCRIPTION OF THE PREFERRED EMBODIMENTS

Reference may now be made in detail to embodiments of the present invention, examples of which are illustrated in the accompanying drawings, wherein like reference numerals refer to like elements throughout.

The mobile device disclosed in the preferred embodiment will be described below in detail with reference to figures.

Figure 1:
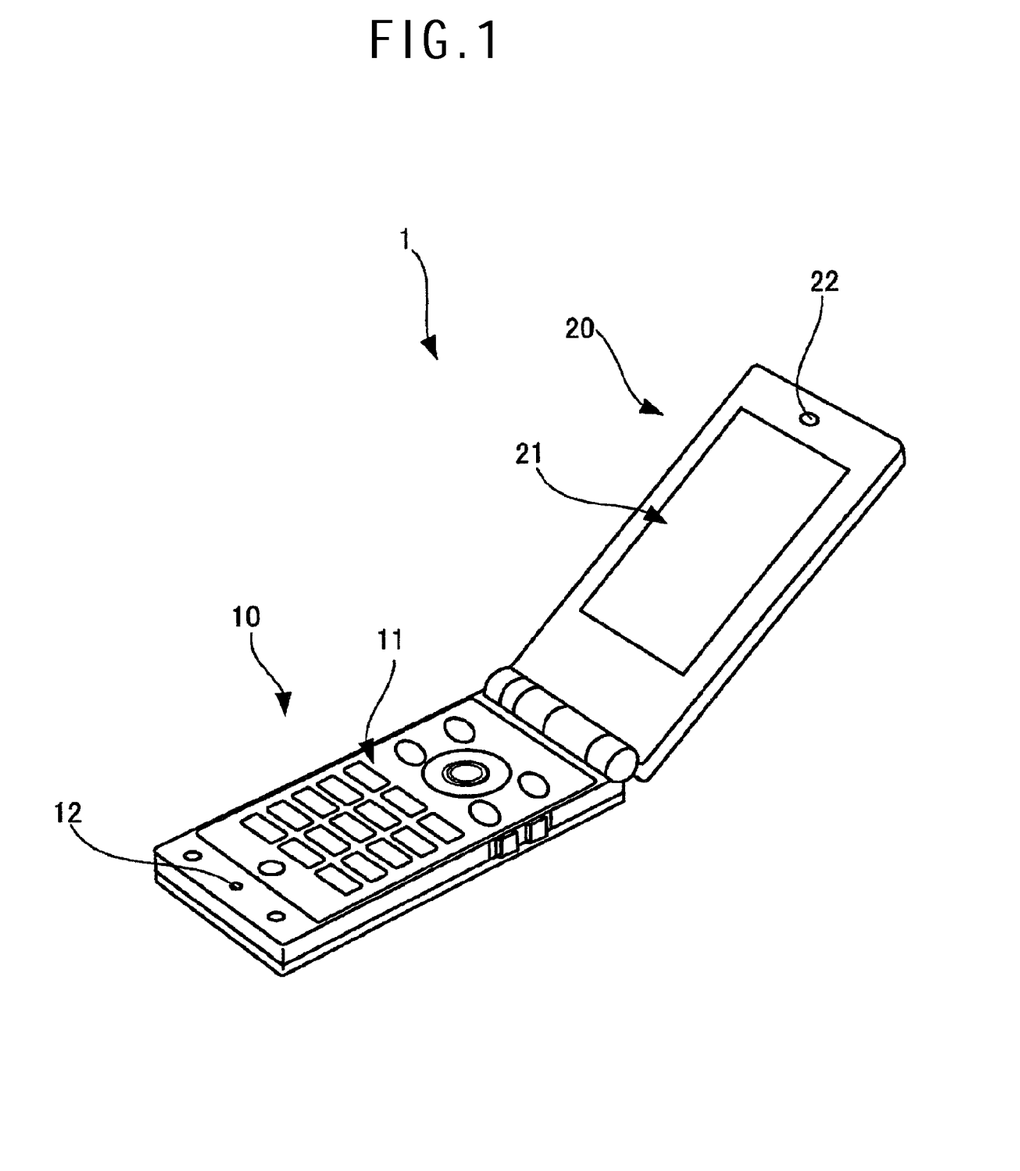
FIG. 1 is a perspective view of the appearance of a mobile phone that is an embodiment of the mobile device disclosed in a preferred embodiment.

FIG. 1 is a perspective view of the appearance of a mobile phone that is an embodiment of the mobile device disclosed in the preferred embodiment.

The mobile phone 1 includes a body unit 10 and a display unit 20. The display unit 20 is pivotally supported by the body unit 10 so that it may be opened or closed.

Many keys 11 are disposed on the body unit 10 for entering telephone numbers or various other information by a user. A mouthpiece 12 is disposed at the lower end of the body unit 10. The mouthpiece 12 is connected to a microphone disposed inside the body unit 10.

The display unit 20 has a display screen 21 in its central area for displaying images. An earpiece 22 is above the display screen 21 for outputting sound from a sound producer disposed inside.

The mobile phone 1 incorporates electronic mail transmission or reception functions, in addition to a radio telephone function and various other functions.

Figure 2:
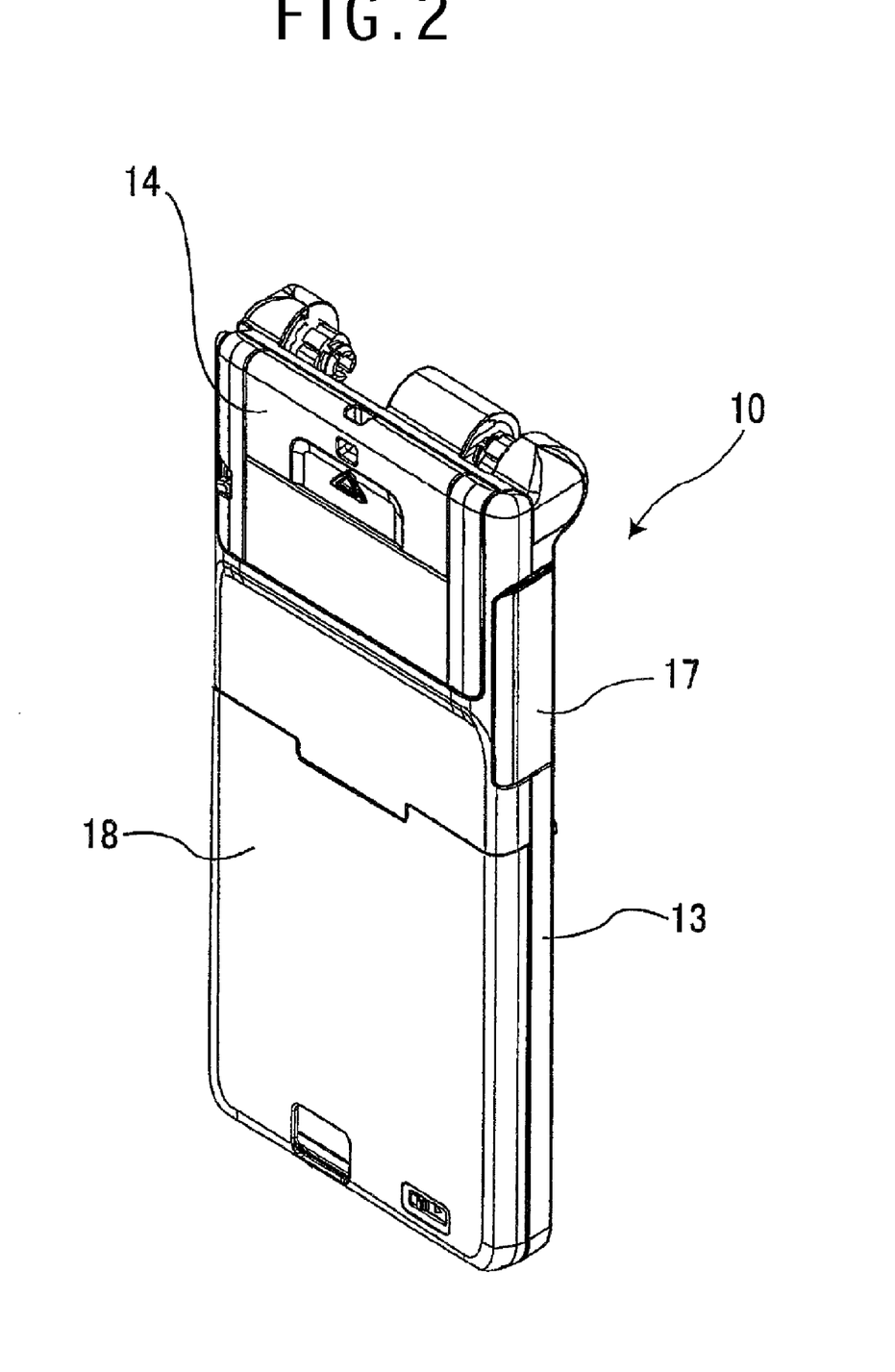
FIG. 2 is a perspective view as viewed from the rear of the body unit.

FIG. 2 is a perspective view as viewed from the rear of the body unit.

A trigger 14 is provided in an upper part of the body unit 10 for a security buzzer. The side of the upper part of the body unit 10 has a lid 17. The lid 17 covers an opening from which a connector accommodated in the housing 13 of the body unit 10 is exposed. The lower part of the body unit 10 has a rear cover 18 covering a battery chamber. Loaded in the battery chamber inside the rear cover is a battery pack. The mobile phone runs on power supplied from the battery pack loaded therein.

The security buzzer trigger 14, the lid 17 covering the opening where the connector is disposed, and the rear cover 17 define the outer shape of the body unit 10 together with the housing 13.

Figure 3:
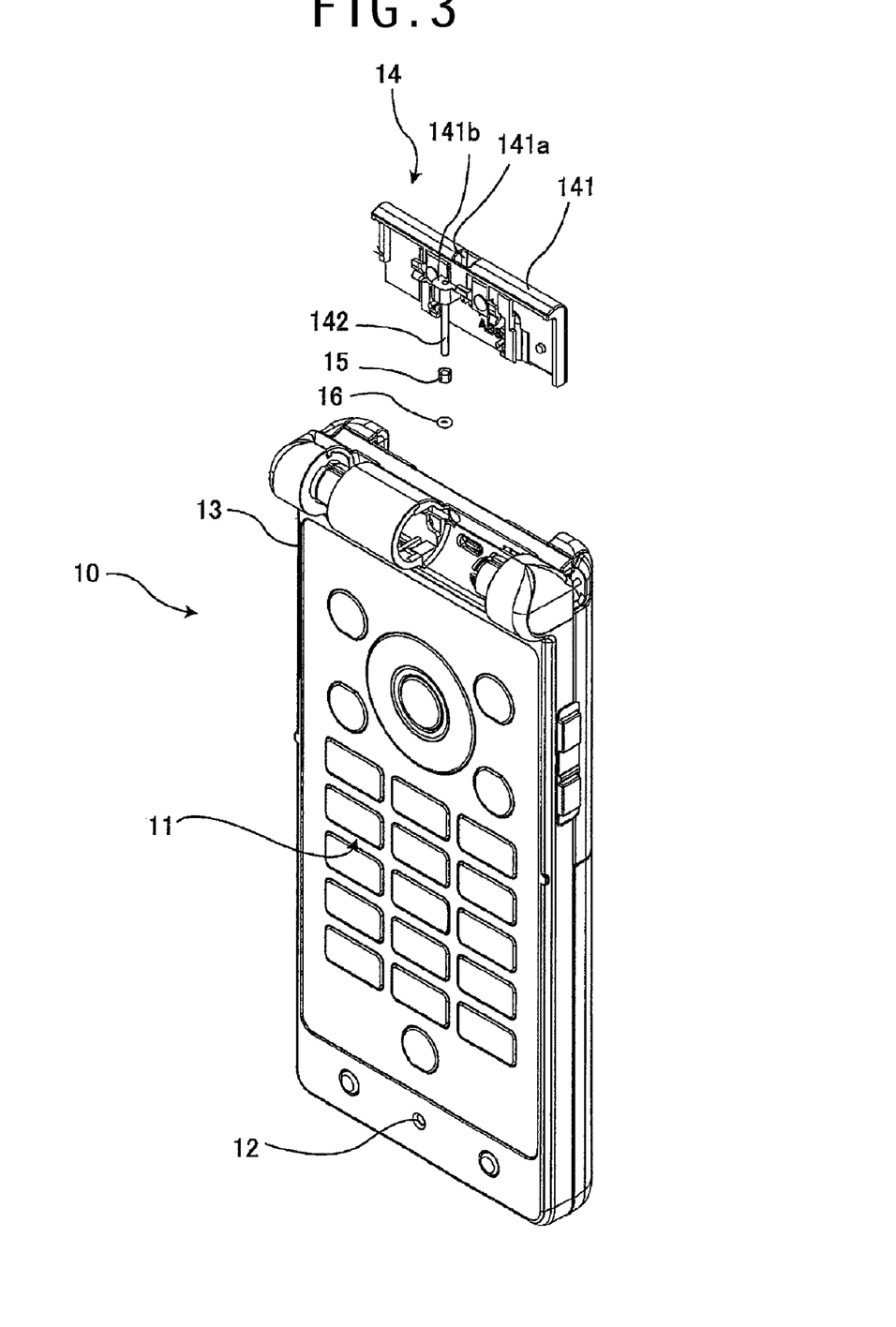
FIG. 3 is an exploded perspective view of the body unit from which a security buzzer trigger is detached.
Figure 4:
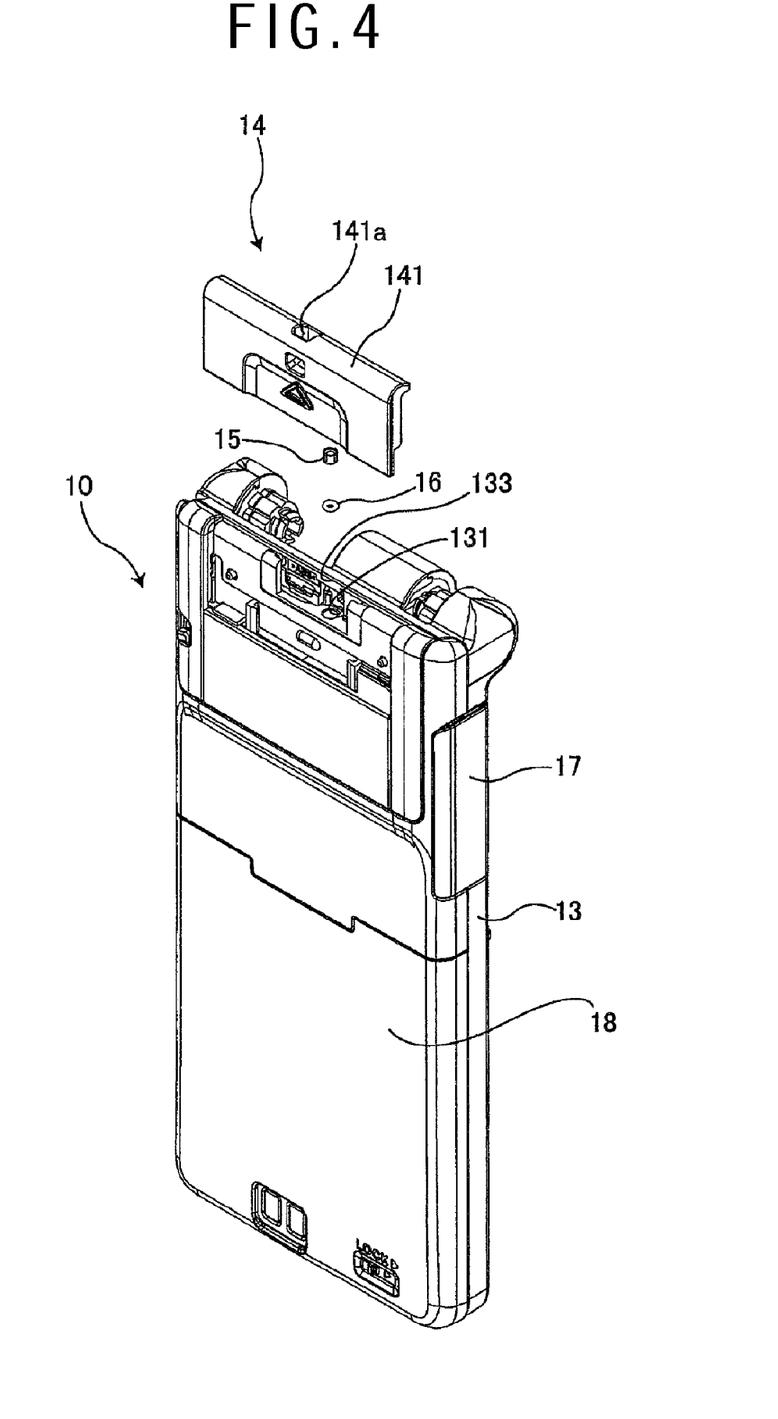
FIG. 4 is an exploded perspective view similar to that in FIG. 3, as viewed from the rear of the body unit.

FIG. 3 is an exploded perspective view of the body unit from which a security buzzer trigger is detached. FIG. 4 is an exploded perspective view similar to that in FIG. 3, as viewed from the rear of the body unit.

The security buzzer trigger 14 includes a molded component 141 defining the outer shape of the mobile phone together with the housing 13 of the body unit 10. The security buzzer trigger 14 also includes a shaft 142 (an example of a rod-like body) fixed to the molded component 141 at one end. The molded component 141 has a hole 141a through which a cord is passed. The shaft 142 is inserted in a holed bushing 15 and an O-ring 16 (an example of a sealing member). The shaft 142 is further inserted into a hole 131 made in the housing 13 of the body unit 10.

The housing 13 of the body unit 10 includes front and rear housings.

Figure 5:
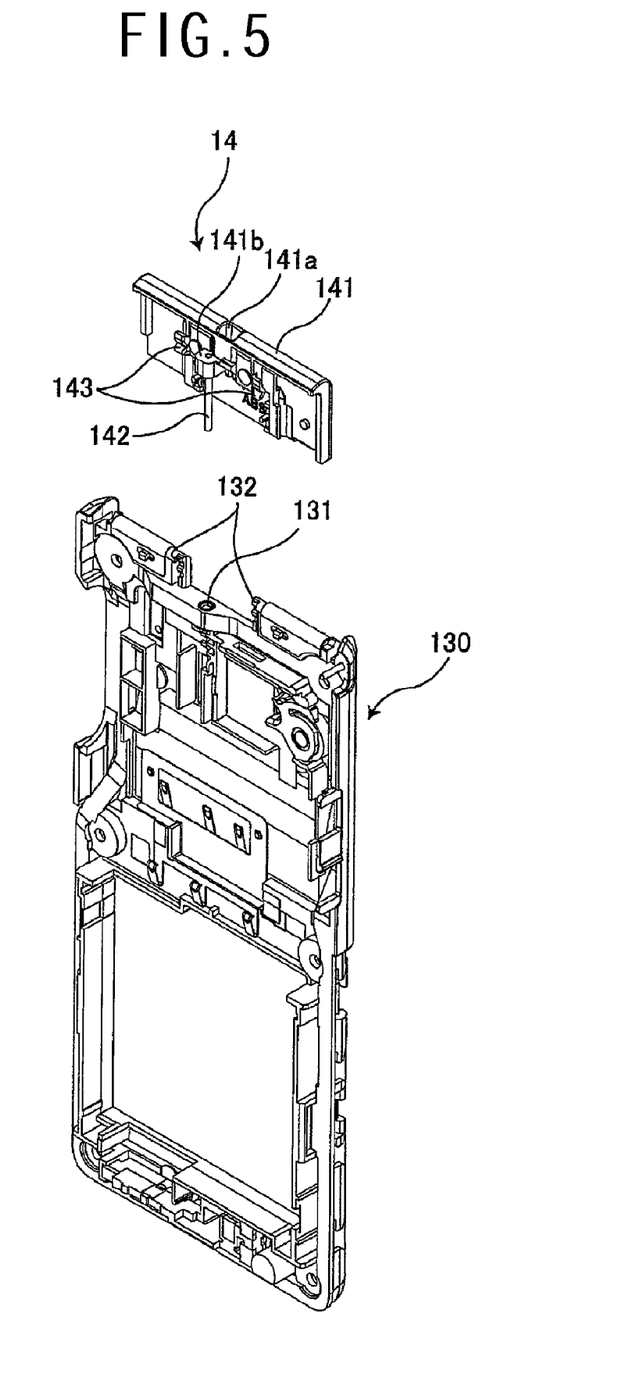
FIG. 5 is an exploded perspective view showing the rear housing of the body unit and the security buzzer trigger.
Figure 6:
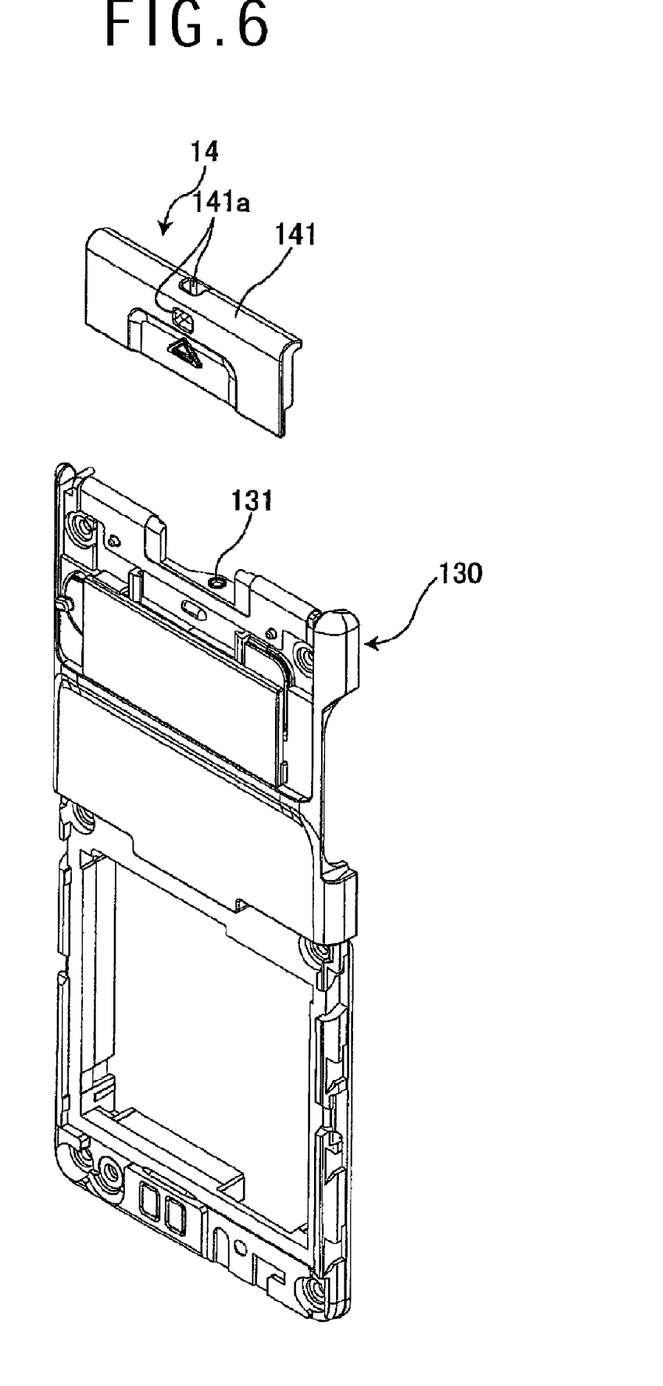
FIG. 6 is an exploded perspective view similar to that in FIG. 5, as viewed from the rear of the rear housing.

FIG. 5 is an exploded perspective view showing the rear housing of the body unit and the security buzzer trigger. FIG. 6 is an exploded perspective view similar to that in FIG. 5, as viewed from the rear of the rear housing.

The insert hole 131, into which the shaft 142 composing the security buzzer trigger 14 is inserted, is formed in the rear housing 130 of the housing 13 shown in FIGS. 3 and 4.

A pair of sheet-metal members 143 is fixed to the security buzzer trigger 14, one on each side of the shaft 142. Guide walls 132 are formed on the rear housing 130, one on each side of the hole 131. The guide walls 132 guide the corresponding sheet-metal members 143 when the trigger 14 is operated in the direction where the shaft 142 is inserted into or pulled from the hole 131.

The shaft 142 can be pulled out from or inserted into the hole 131 perpendicularly, since the security buzzer trigger 14 is guided on both sides of the hole 131 and the shaft 142 is inserted into the hole 131. This ensures more reliable operability.

The security buzzer trigger 14 is moved from the position where the shaft 142 is inserted deepest into hole 131 in the direction in which the shaft 142 is pulled. Thereby the head 141b of the molded component 141 comes into contact with a stopper 133 formed on the wall of the housing 13, thus preventing the shaft from being pulled further. Accordingly, the trigger 14 can be used repeatedly by pushing the trigger 14 again from this position.

Figure 7:
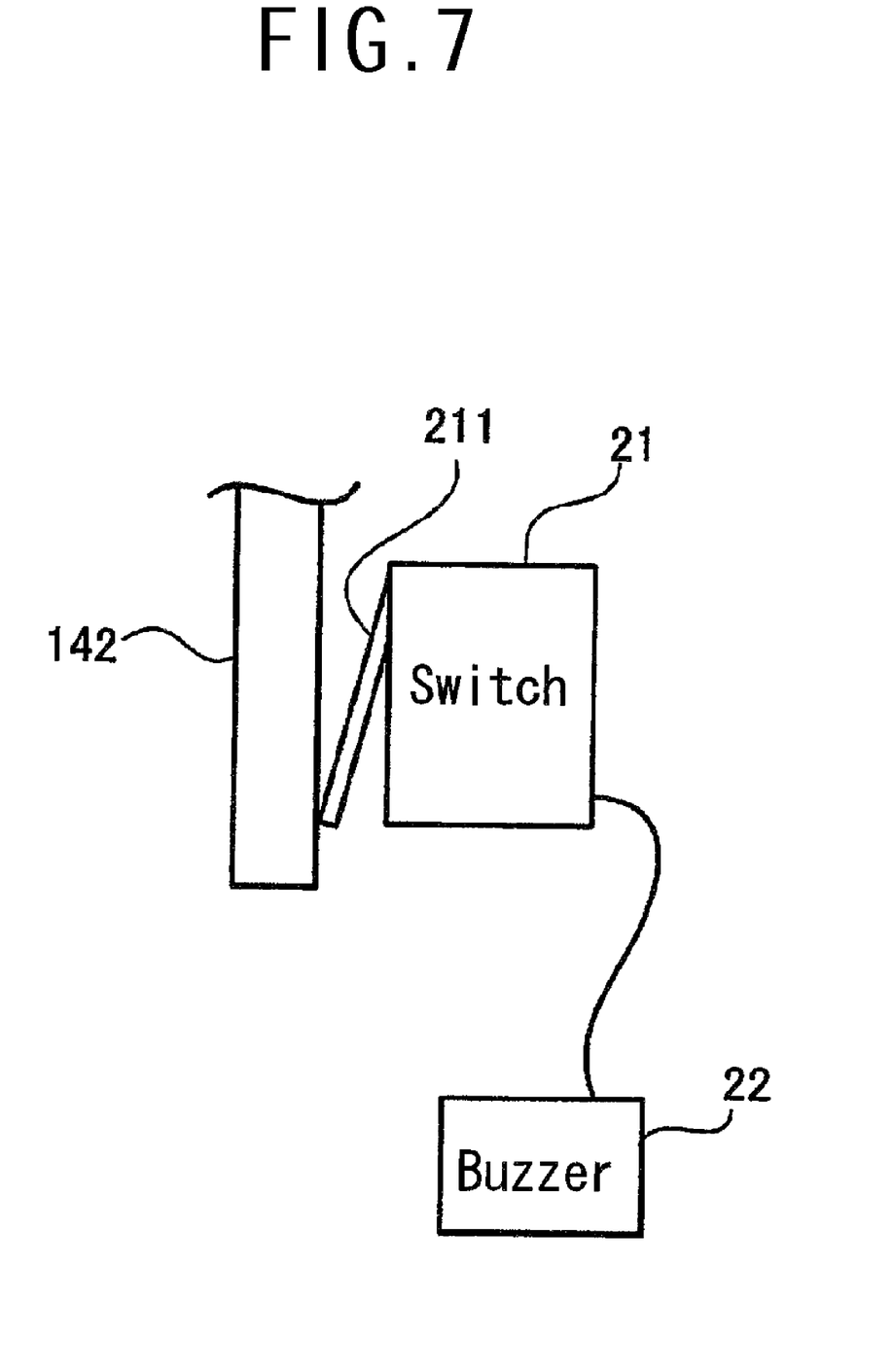
FIG. 7 shows the positional relation between a shaft and a switch when the security buzzer trigger is pushed to the position shown in FIG. 2.

FIG. 7 shows the positional relation between a shaft and a switch when the security buzzer trigger is pushed to the position shown in FIG. 2.

Figure 8:
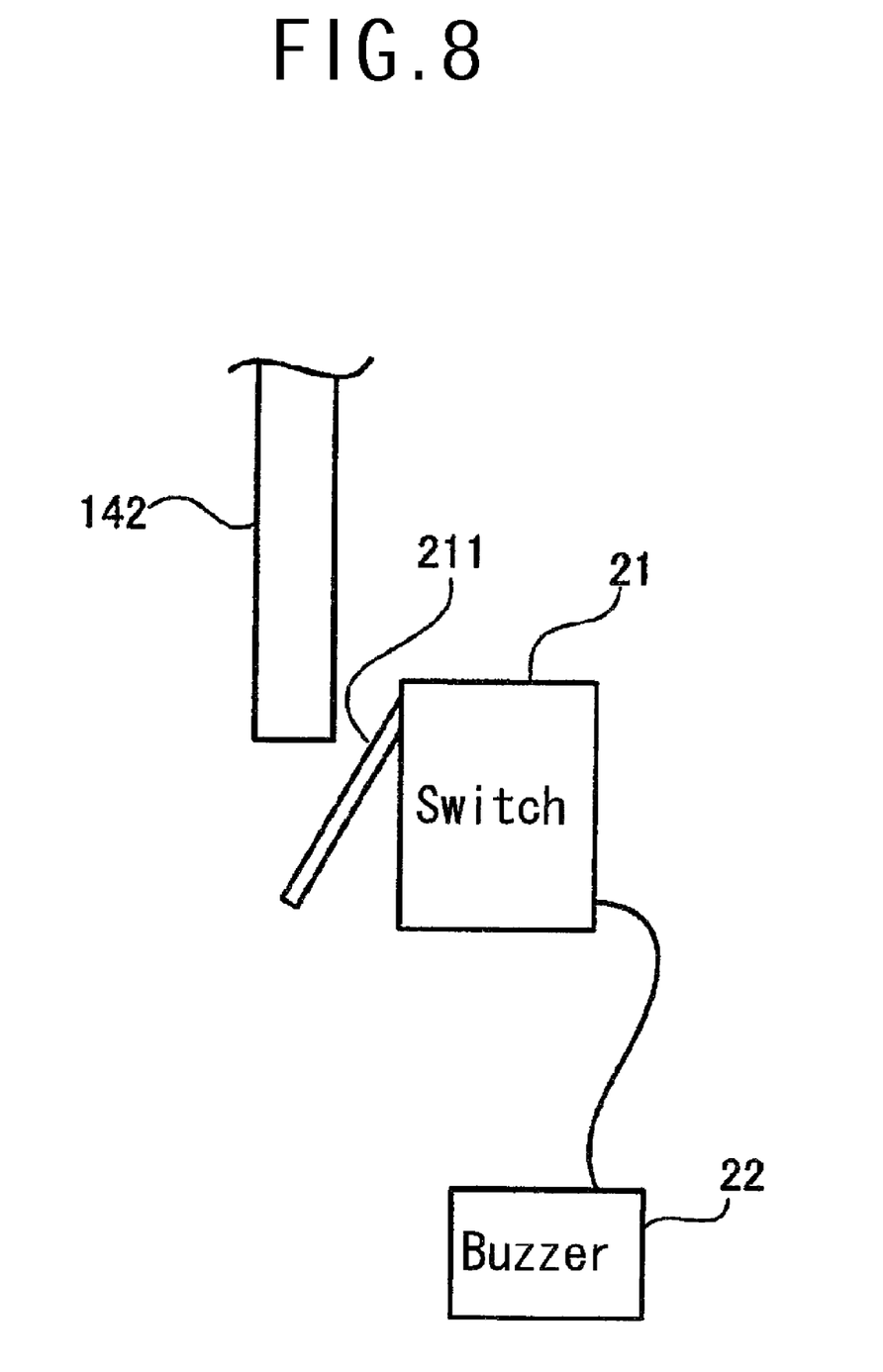
FIG. 8 shows the positional relation between the shaft and the switch when the security buzzer trigger is pulled to the position where the head of a molded component has come into contact with the stopper of the housing.

FIG. 8 shows the positional relation between the shaft and the switch when the security buzzer trigger is pulled to the position where the head of a molded component has come into contact with the stopper of the housing.

The housing 13 of the body unit 10 incorporates a switch 21 and a buzzer 22. The shaft 142 interferes with the arm 211 of the switch 21, as shown in FIG. 7, when the trigger 14 is in the position shown in FIG. 2. The buzzer 22 is not activated in this condition. The shaft 142 is separated from the arm 211 of the switch 21 when the trigger 14 is operated in the pulled direction, as shown in FIG. 8. Consequently, the switch 21 detects the operation of the trigger 14 and the buzzer 22 is activated. The shaft 142 interferes with the arm 211 of the switch 21, as shown in FIG. 7, when the trigger 14 is pushed again to the position shown in FIG. 2, thereby deactivating the buzzer.

Figure 9:
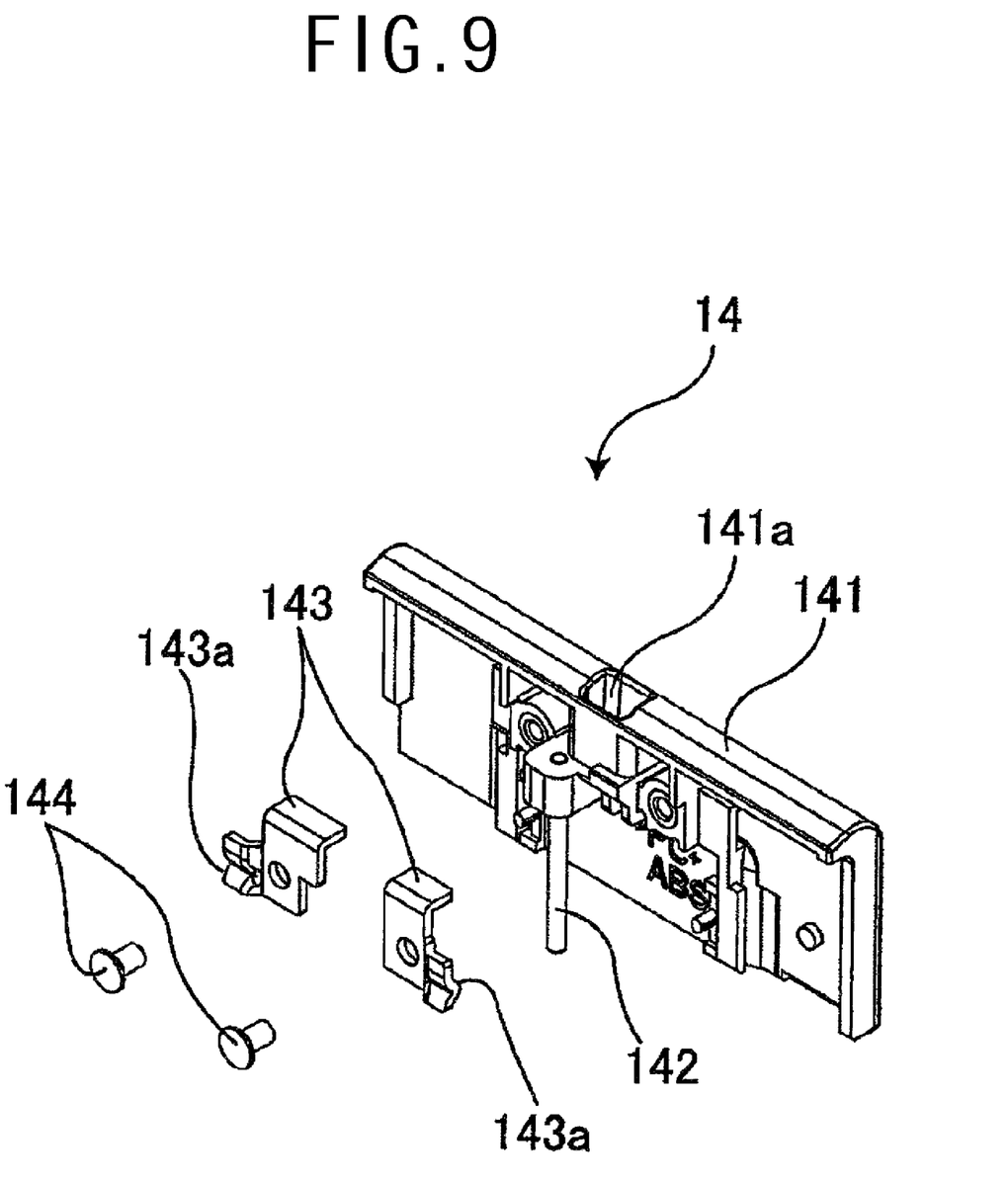
FIG. 9 is an exploded perspective view of the structure of a security buzzer trigger.

FIG. 9 is an exploded perspective view of the structure of a security buzzer trigger.

Figure 10:
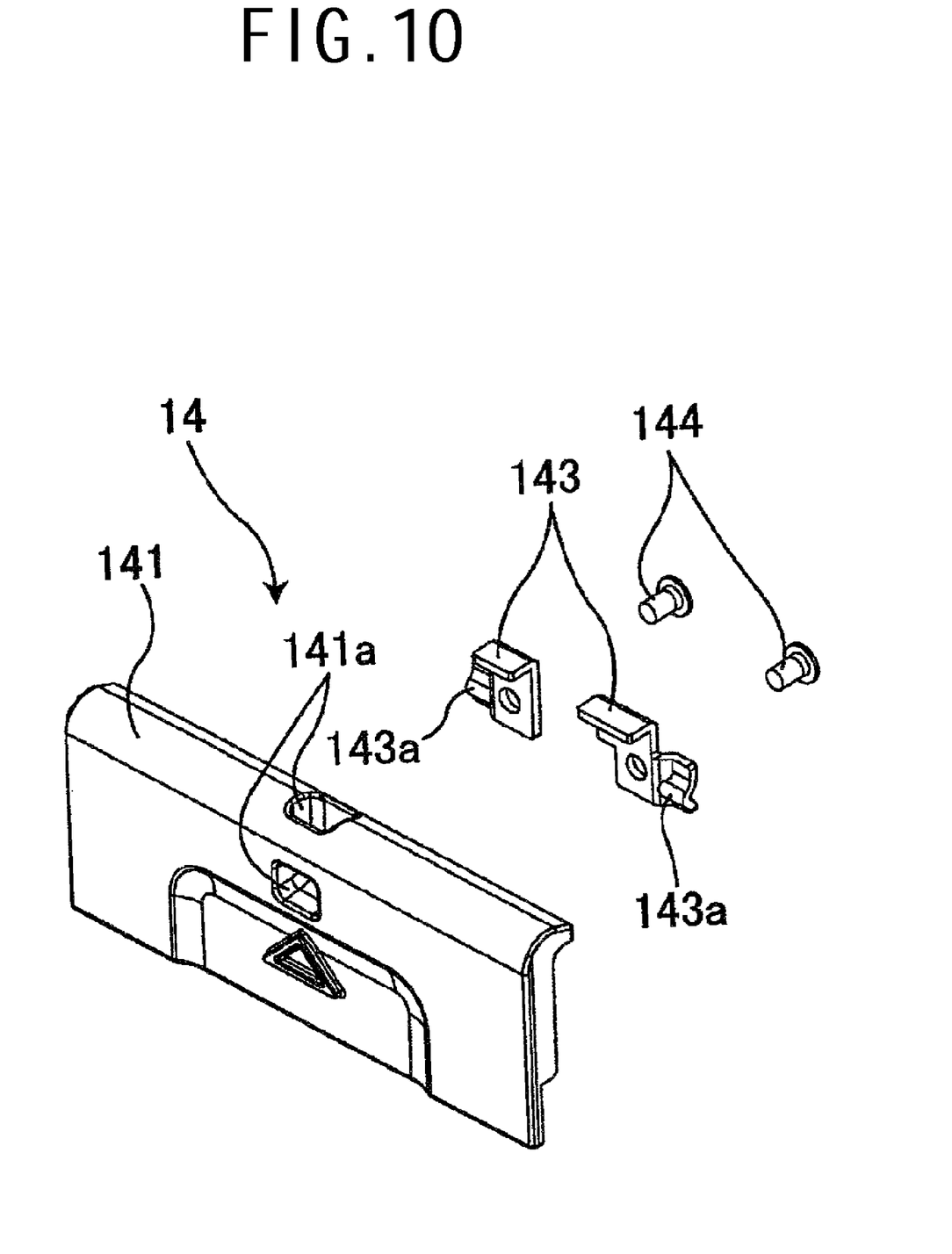
FIG. 10 is an exploded perspective view similar to that in FIG. 9, as viewed from the opposite direction to FIG. 9.

FIG. 10 is an exploded perspective view similar to that in FIG. 9, as viewed from the opposite direction to FIG. 9.

As described above, the security buzzer trigger 14 has the molded component 141 defining part of the appearance of the mobile phone. The security buzzer trigger 14 also has the shaft 142, one end of which is firmly fitted into the molded component 141. The security buzzer trigger 14 also has the pair of sheet-metal members 143 disposed on either side of the shaft 142. Each of these sheet-metal members 143 is fixed to the molded component 141 with a screw 144.

Each of the sheet-metal members 143 has a clip 143a curving in the direction in which the shaft 142 is inserted or pulled. The clip 143a projects toward and is in contact with the corresponding guide wall 132 shown in FIG. 5. The clip 143a moves on the guide wall 132 when the trigger 14 is operated.

Figure 11:
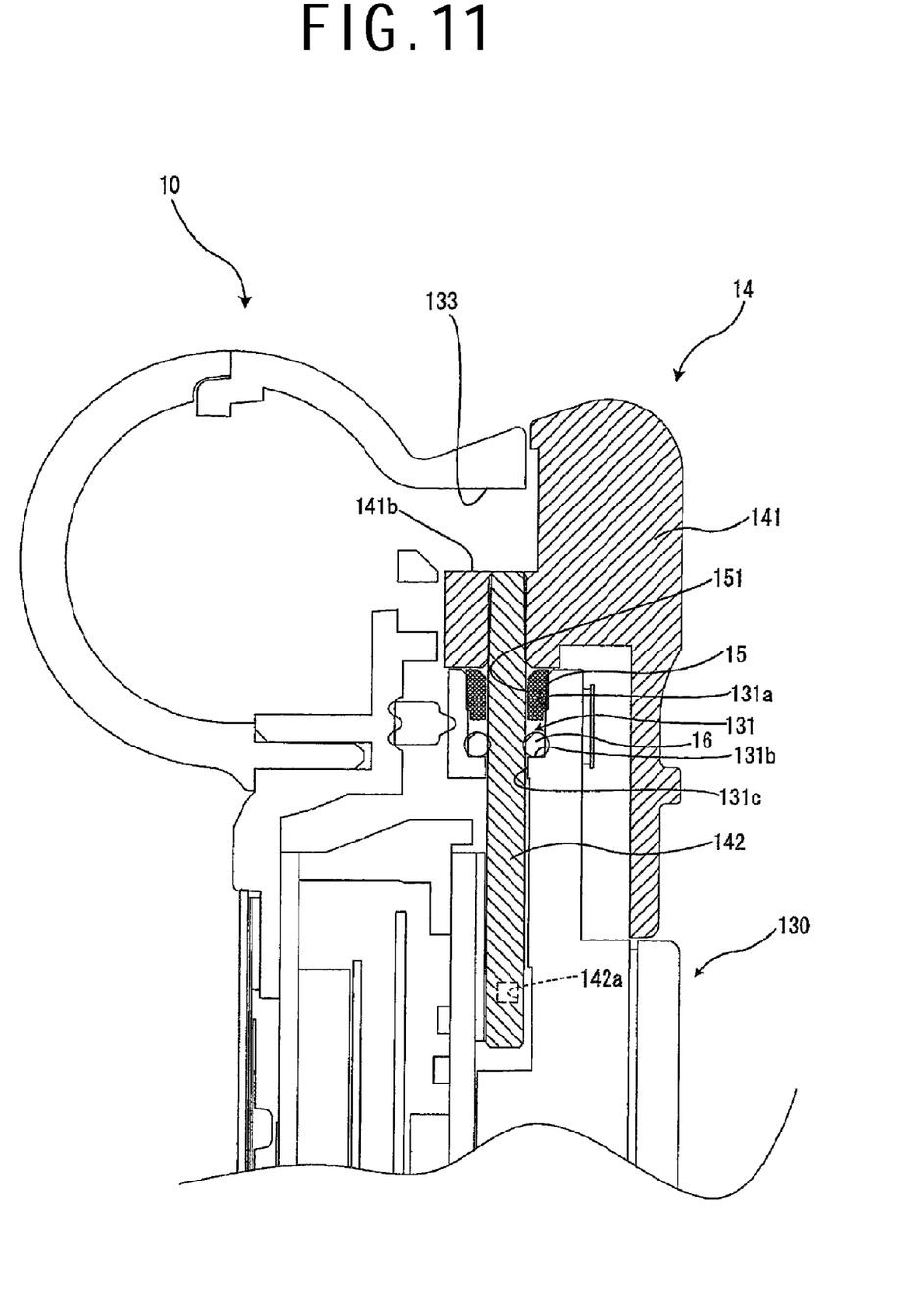
FIG. 11 is a sectional view showing where the shaft of the security buzzer trigger has been inserted into the housing.

FIG. 11 is a sectional view showing where the shaft of the security buzzer trigger has been inserted into the housing.

An entrance portion 131a of the hole 131 made in the rear housing 130 composing the body unit is greater in diameter than the shaft 142. A step 131b is formed in a predetermined place between both ends of the hole 131. A portion 131c located beyond the step 131 tapers. The bushing 15 shown in FIGS. 3 and 4 has a hole 151 through which the shaft 142 passes. This bushing 15 is fitted firmly in the entrance of the hole 131. The O-ring 16 is disposed at the entrance portion 131a of the hole 131 and beyond the bushing 15 such that the position of the O-ring 16 is restricted by the step 131b and bushing 15. This O-ring 16 is disposed in contact with both the shaft 142 and the internal wall of the hole 131. This O-ring 16 prevents water from entering beyond the O-ring 16. The shaft 142 has an action point 142a near its leading end. The action point 141 serves to act on the switch 21 when the leading end is inserted in the hole 131. The head 141b of the molded component 141, into which the shaft 142 is kept firmly fitted, comes into contact with the stopper 133 formed on the housing of the body unit 10 when the trigger 14 is operated in the direction in which the shaft 142 is pulled. This prevents the trigger 14 from separating. Accordingly, the trigger 14 can be operated repeatedly while the O-ring 16 prevents the entry of water.

In the preferred embodiment, a description was given of only the waterproof structure for the security buzzer trigger 14. However, the entire mobile phone is rendered waterproof to be designed as a waterproof mobile device.

Figure 12:
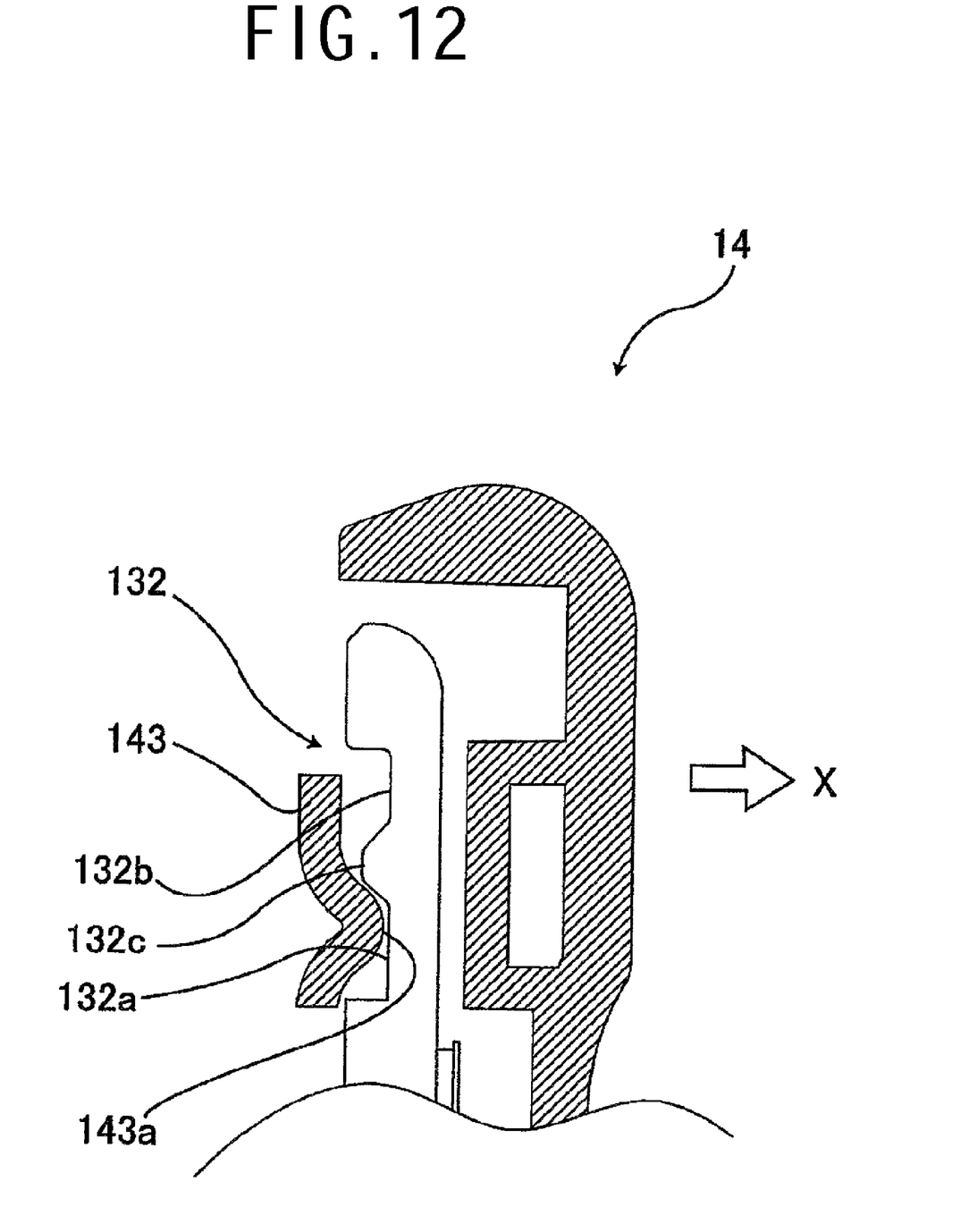
FIG. 12 is a view illustrating mutual action between the clips of the sheet-metal members provided for the security buzzer trigger and the corresponding guide walls formed on the housing.

FIG. 12 is a view illustrating mutual action between the clips of the sheet-metal members provided for the security buzzer trigger and the corresponding guide walls formed on the housing.

Figure 13:
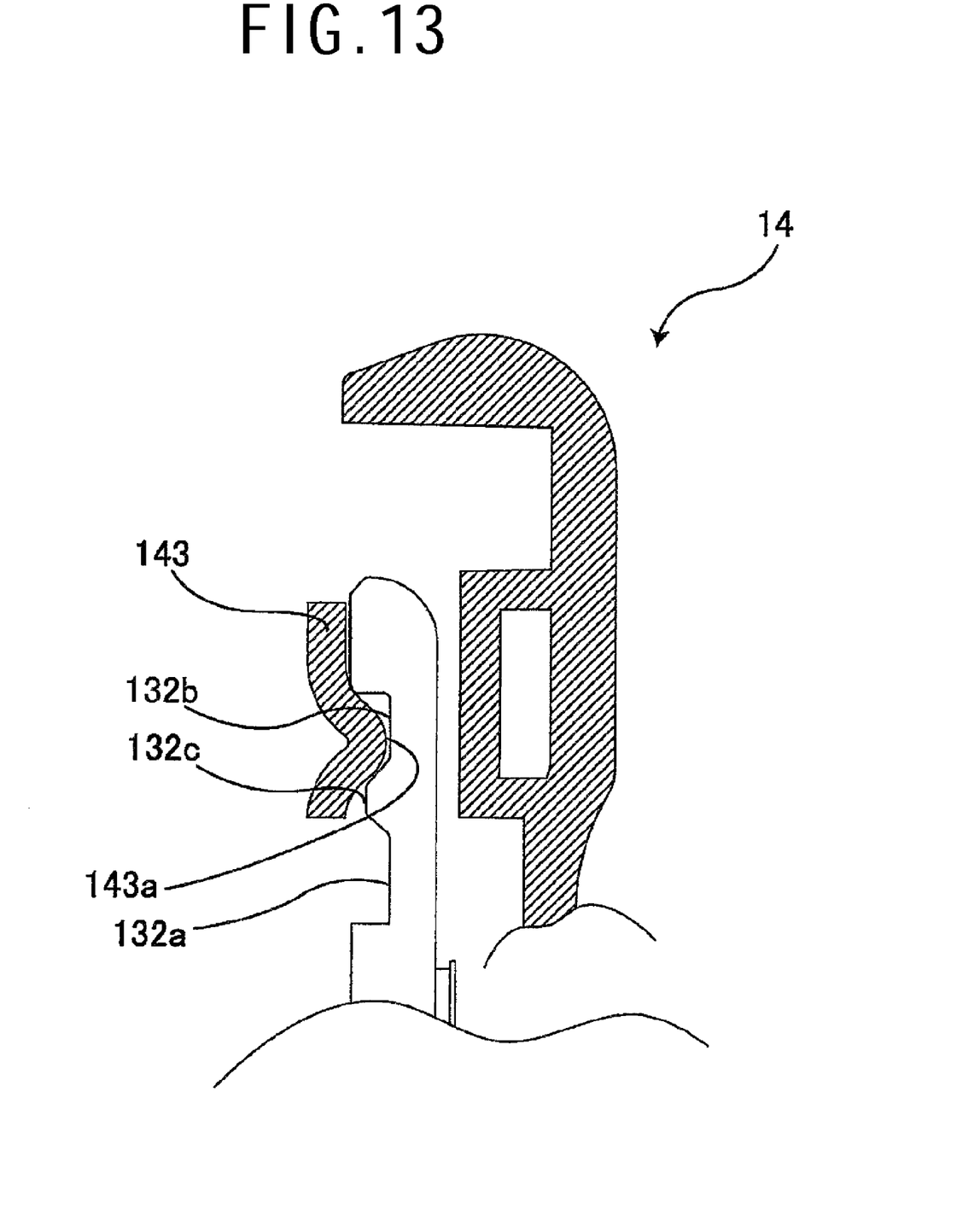
FIG. 13 is another view illustrating mutual action between the clips of the sheet-metal members provided for the security buzzer trigger and the corresponding guide walls formed on the housing.

FIG. 13 is another view illustrating mutual action between the clips of the sheet-metal members provided for the security buzzer trigger and the corresponding guide walls formed on the housing.

Each of the sheet-metal members 143 has a clip 143a curving in the direction in which the shaft 142 is inserted or pulled and projecting toward the corresponding guide wall 132 of the housing.

Each of the guide walls 132 includes a first recess 132a which the clip 143a of the corresponding sheet-metal member 143 enters when the trigger 14 is pushed as shown in FIG. 2. Each of the guide walls 132 also includes a second recess 132b which the clip 143a enters when the trigger 14 is pulled as shown in FIG. 13. Each of the guide walls 132 also includes a wall 132c formed between the first and second recesses 132a and 132b. Accordingly, an operator can feel when the clip 143a moves over the wall 132c in the course of the movement of the trigger 12 from the pushed position shown in FIG. 12 to the pulled position shown in FIG. 13 and vice versa by clicking the trigger 14. This improves the operability of the device.

In the preferred embodiment, sheet-metal members 143 serve to improve strength. Accordingly, even if force is applied to the trigger 14 accidentally in the direction indicated by arrow X shown in FIG. 12, the sheet-metal members 143 are sufficient to resist such force, thus ensuring higher reliability.

The preferred embodiment has used a mobile phone as an example but can be widely used for portable video game machines and other portable devices.

A portable device according to the foregoing embodiment incorporates a buzzer in a small space and is waterproof even in performance.

All examples and conditional language recited herein for pedagogical purposes to aid the reader in understanding the principles of the invention and the concepts contributed by the inventor to furthering the art, and are to be construed as being without limitation to such specifically recited examples and conditions, nor does the organization of such example in the specification relate to a showing of the superiority and inferiority of the invention. Although the embodiments of the present inventions have been described in detail, it should be understood that the various changes, substitutions, and alterations could be made hereto without departing from the sprit and scope and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A mobile device comprising:
   a trigger having a rod-like body fixed at one end;
   a housing having a first hole into which the rod-like body is inserted, the first hole being taperingly formed such that an entrance portion of the hole is larger in diameter than the rod-like body and a step is formed at a predetermined place between both ends of the hole;
   a sensor for detecting that the trigger has been operated in the direction in which the rod-like body is pulled from the hole;
   a buzzer activated in response to the sensor's having detected the operation of the trigger;
   a firmly fitted member in which a second hole is formed so that the rod-like body is inserted in the second hole so as to be freely slid forward or backward against the second hole, the firmly fitted member being firmly fitted in the entrance portion of the first hole; and
   a sealing member disposed between the step and the firmly fitted member in the first hole so as to be in contact with the internal wall of the first hole and the rod-like body.

2. The mobile device according to claim 1, wherein the housing has a stopper with which the trigger comes into contact when the rod-like body is operated by a predetermined stroke in the direction in which the rod-like body is pulled from the first hole.

3. The mobile device according to claim 2, wherein the sensor is a switch released from the action of the rod-like body before the trigger being operated comes into contact with the stopper.

4. The mobile device according to claim 2, wherein the trigger also has projections, and the housing has:
   first recesses for receiving the corresponding projections when the rod-like body is in a first position where the rod-like body has been inserted deepest in the first hole;
   second recesses for receiving the projections when the trigger is pulled to a second position where the trigger has come into contact with the stopper; and
   walls formed between the corresponding first recesses and corresponding second recesses so that the projections move over the walls.

5. The mobile device according to claim 1, wherein the mobile device is a mobile phone that has a radio communication function.

6. A method of activating an alarm device in a mobile device comprising:
   fixing a rod-like body at one end of a trigger;
   forming a first hole taperingly in a housing such that an entrance portion of the hole is larger in diameter than the rod-like body;
   forming a step at a predetermined place between both ends of the hole;
   inserting the rod-like body into the first hole in the housing,
   detecting that the trigger has been operated in the direction in which the rod-like body is pulled from the hole;
   activating the alarm device in response to detecting the operation of the trigger;
   forming a second hole in a firmly fitted member;
   inserting the rod-like body in the second hole so as to be freely slid forward or backward against the second hole;
   fitting the firmly fitted member in the entrance portion of the first hole; and
   disposing a sealing member between the step and the firmly fitted member in the first hole so as to be in contact with the internal wall of the first hole and the rod-like body.

* * * * *